United States Patent [19]

Mori

[11] Patent Number: 4,942,532
[45] Date of Patent: Jul. 17, 1990

[54] SYSTEM FOR CONTROLLING THE STEERING ANGLE OF THE REAR WHEELS OF A FOUR-WHEEL-STEERABLE MOTOR VEHICLE

[75] Inventor: Kazunori Mori, Ebina, Japan
[73] Assignee: Nissan Motor Co., Ltd., Japan
[21] Appl. No.: 195,078
[22] Filed: May 17, 1988
[30] Foreign Application Priority Data May 20, 1987 [JP] Japan ................................ 62-121015

[51] Int. Cl.⁵ .............................................. B62D 7/14
[52] U.S. Cl. ................................ 364/424.05; 180/140; 180/142; 280/91
[58] Field of Search ..................... 364/424.01, 424.05; 280/91; 180/140, 141, 142, 79.1; 74/388 PS; 318/580

[56] References Cited

U.S. PATENT DOCUMENTS

| | | | |
|---|---|---|---|
| 3,866,706 | 2/1975 | Lincke et al. | 180/142 |
| 4,105,086 | 8/1978 | Ishii et al. | 180/79 |
| 4,412,594 | 11/1983 | Furakawa et al. | 180/142 |
| 4,440,254 | 4/1984 | Shibahata et al. | 180/140 |
| 4,441,572 | 4/1984 | Ito et al. | 180/140 |
| 4,597,462 | 7/1986 | Sano et al. | 180/140 |
| 4,598,788 | 7/1986 | Serizawa et al. | 180/141 |
| 4,666,013 | 5/1987 | Shibahata et al. | 180/141 |
| 4,690,431 | 9/1987 | Ito et al. | 180/142 X |
| 4,705,131 | 11/1987 | Shibahata et al. | 180/140 |
| 4,706,978 | 11/1987 | Ito | 208/91 |
| 4,718,685 | 1/1988 | Kawabe et al. | 280/91 |

Primary Examiner—Thomas G. Black
Attorney, Agent, or Firm—Leydig, Voit & Mayer

[57] ABSTRACT

A system for controlling the steering angle of the rear wheels of a four-wheel-steerable motor vehicle has a controller which steers the rear wheels in a manner to satisfy the following equation:

$$\frac{\delta r(s)}{\delta f(s)} = \frac{Bs^2 + Cs + D}{As + 1}$$

where:
$\delta f(s)$: Laplace transform of the front wheel steering angle;
$\delta r(s)$: Laplace transform of the rear wheel steering angle;
A: function A(V) of vehicle speed V;
B: function B(V, $\phi_0$) of vehicle speed V and normal yaw rate gain $\phi_0$;
C: function C(V, $\phi_0$) of vehicle speed V and normal yaw rate gain $\phi_0$;
D: function D(V, $\phi_0$) of vehicle speed V and yaw rate gain $\phi_0$; and
s: Laplace transform variable.

4 Claims, 2 Drawing Sheets

SYSTEM FOR CONTROLLING THE STEERING ANGLE OF THE REAR WHEELS OF A FOUR-WHEEL-STEERABLE MOTOR VEHICLE

BACKGROUND OF THE INVENTION

1. Field of the Invention

The present invention relates in general to a steering control system for a four-wheel-steerable motor vehicle, and more particularly to a control system for controlling the steering angle of the rear wheels of a four-wheel-steerable motor vehicle.

2. Description of the Prior Art

In a regular motor vehicle wherein only the front wheels are steerable, the yaw rate gain and the phase angle relative to the steering frequency (f) have the characteristics respectively depicted by dashed lines "a" and "b" of the graphs of FIGS. 3A and 3B. As can be seen from these curves, with an increase in the steering frequency (f), the yaw rate gain is reduced and the phase lag of the yawing, is increased. This means that during steering at a higher frequency, the yaw response inevitably is poor.

In view of this drawback, a so-called four-wheel-steerable motor vehicle has been proposed in which the rear wheels as well as the front wheels are steered in accordance with the operation of a steering wheel. In this type of motor vehicle, the steering angle of the rear wheels is usually determined in the following manner.

The motion of the motor vehicle is represented by the following four equations (1), (2), (3) and (4):

$$M(\ddot{y}+V\dot{\phi})=Ff+Fr\ldots \quad (1)$$

where:
M=mass of vehicle,
ÿ=transverse acceleration,
V=vehicle speed,
$\dot{\phi}$=yaw angular speed,
Ff=side force of front wheels, and
Fr=side force of rear wheels.

$$\ddot{\phi}=aFf-bFr\ldots \quad (2)$$

where:
I=yaw inertia moment of vehicle
$\ddot{\phi}$=yaw angular acceleration,
a=distance between front axle and center of gravity of vehicle,
b=distance between rear axle and center of gravity of vehicle.

$$Ff = Cf\left(\delta f - \frac{\dot{y}+a\dot{\phi}}{V}\right) \quad (3)$$

$$Fr = Cr\left(\delta r - \frac{\dot{y}-b\dot{\phi}}{V}\right) \quad (4)$$

where:
Cf=cornering power of front wheels,
Cr=cornering power of rear wheels,
δf=steering angle of front wheels, (=steering angle θ of steering wheel/steering gear ratio (N)),
δr=steering angle of rear wheels, and
ÿ=transverse acceleration of vehicle.

The above-mentioned four equations (1), (2), (3) and (4) are combined by using Laplace transformation to provide the following equation.

$$\frac{\dot{\phi}(s)}{\delta f(s)} = \frac{aCfMs + \frac{CfCrl}{V} - \frac{\delta r(s)}{\delta f(s)}\left(bCrMS + \frac{CfCrl}{V}\right)}{MI(s_2 + 2\zeta\omega_n s + \omega_n^2)} \quad (5)$$

where:
$\dot{\phi}(s)$=Laplace transform of yaw angular speed,
δf(s)=Laplace transform of front wheel steering angle,
s=Laplace transform variable,
l=Wheel base (= a+b),
δ(s)=Laplace transform of rear wheel steering angle,
ωn=natural frequency,
ζ=damping ratio, $$\omega n^2 = \frac{CfCrl^2 - MV^2(aCf - bCr)}{MIV^2}$$

$$2\zeta\omega n = \frac{I(Cf + Cr) + M(a^2Cf + b^2Cr)}{MIV}$$

Hitherto, the value of δr(s)/δf(s) is replaced with K+τ₁S (wherein, K and τ₁ are constants in order to determine the steering angle of the rear wheels by finding the values of K and τ₁ so as to make the value $\dot{\phi}(s)/\delta f(s)$ equal another constant k.

As is seen from the yaw rate gain characteristic depicted by the line "c" of FIG. 3A and the phase angle characteristic depicted by line "d" of FIG. 3B, the above-mentioned method can prevent the lowering, of the yaw rate gain and the yaw response lag at higher steering frequencies.

However, the above-described has the following drawbacks.

In the conventional method, to achieve constants the above-mentioned characteristics, "K" and "τ₁" are employed and thus the value "k" is expressed as k=−(bCrτ₂)/I.

Thus, the normal yaw rate gain $\dot{\phi}_0$ can not be changed. This means that, as shown by curve "e" of FIG. 3A, the tuning of the normal yaw rate gain (the steerability) for each motor vehicle can not be achieved. As is well known, if the yaw rate gain can not be tuned, it is impossible to prevent the undesired lowering of the yaw rate gain at higher steering frequencies while keeping the normal yaw rate gain at its original value.

SUMMARY OF THE INVENTION

It is therefore an object of the present invention to provide a system for controlling the steering angle of the rear wheels of a four-wheel-steerable motor vehicle which is free of the above-mentioned drawbacks.

A system for controlling the steering angle of the rear wheel of a four-wheel-steerable motor vehicle according to the present invention includes a rear-wheel steering mechanism and a controller which controls the rear-wheel steering mechanism so as to satisfy the following equation:

$$\frac{\delta r(s)}{\delta f(s)} = \frac{Bs^2 + Cs + D}{As + 1}$$

where:
δf(s): Laplace transform of front wheel steering angle;
δr(s): Laplace transform of rear wheel steering angle;
A: function A(V) of vehicle speed V;

B: function $B(V, \dot\phi_0)$ of vehicle speed V and normal yaw rate $\dot\phi_0$;
C: function $C(V, \dot\phi_0)$ of vehicle speed V and normal yaw rate gain $\dot\phi_0$;
D: function $D(V, \dot\phi_0)$ of vehicle speed V and yaw rate gain $\dot\phi_0$; and
S: Laplace transform variable.

DESCRIPTION OF THE PREFERRED EMBODIMENTS

In the present invention, the steering angle of the rear wheels is controlled in accordance with the following equation (6).

$$\frac{\delta r(s)}{\delta f(s)} = \frac{Bs^2 + Cs + D}{As + 1} \quad (6)$$

where:
A: function A(V) of vehicle speed V represented by:

$$A = \frac{bMV}{Cfl}$$

B: function $B(V, \dot\phi_0)$ of vehicle speed V and normal yaw rate gain $\dot\phi_0$ represented by:

$$B = \frac{\dot\phi_0 MIV}{CfCrl}$$

C: function $C(V, \dot\phi_0)$ of vehicle speed V and normal yaw rate gain $\dot\phi_0$ represented by:

$$C = \frac{V}{CfCrl} (aCfM - \dot\phi_0 MI \cdot 2\zeta\omega_n)$$

D: function $D(V, \dot\phi_0)$ of vehicle speed V and yaw rate gain $\dot\phi_0$ represented by:

$$D = 1 - \frac{\dot\phi_0 VMI\omega_n^2}{CfCrl}$$

In the control system using equation (6), the value "A" based on the vehicle speed "V" and the values "B", "C" and "D" based on both the vehicle speed "V" and the desired normal yaw rate gain "$\dot\phi_0$" are determined, and these values are plugged into equation (6) for controlling the steering angle of the rear wheels.

Figure 1:
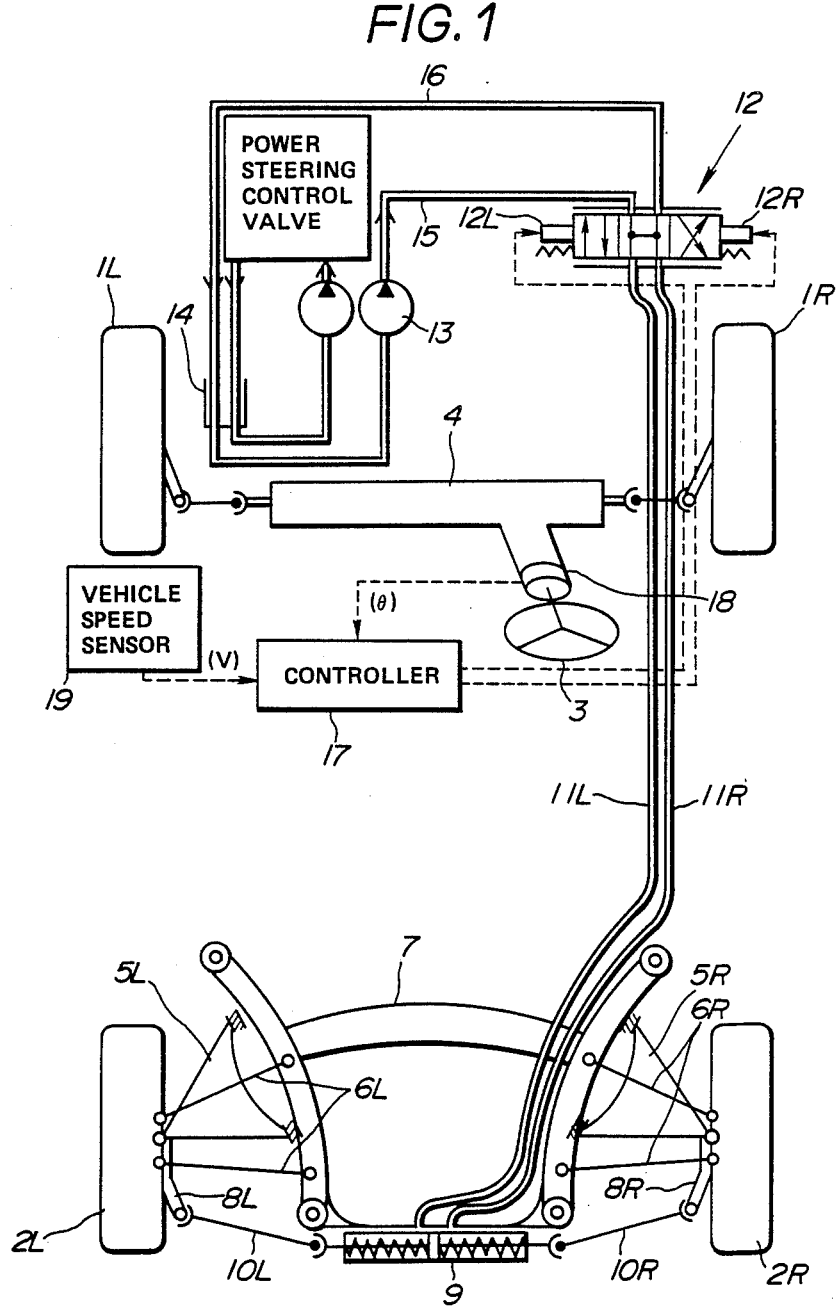
FIG. 1 is a schematic illustration of a four-wheel-steerable motor vehicle to which the present invention is applied.

FIG. 1, schematically illustrates a four-wheel-steerable motor vehicle to which the present invention is applied. In the drawing, 1L and 1R denote front left and right steerable wheels. These front wheels 1L and 1R are connected through a steering gear 4 to a steering wheel 3, so that the front wheels 1L and 1R are steered in response to operation of the steering wheel 3. The steering angle δf of the front wheels 1L and 1R is expressed as follows:

$$\delta f = \theta/N \quad (7)$$

where:
θ = steering angle of steering wheel; and
N = steering gear ratio.

The rear wheels 2L and 2R are connected to a rear suspension member 7 through a rear suspension mechanism which comprises left and right transverse links 5L and 5R and left and right upper arms 6L and 6R. An actuator 9 and left and right side rods 10L and 10R for steering the rear wheels 2L and 2R are interposed between left and right knuckle arms 8L and 8R.

The actuator 9 is hydraulically operated and centered by springs. It comprises two working chambers each connected through a pipe 11L or 11R to an electromagnetic proportional pressure control valve 12 which controls the opening degree in proportion to input signals applied thereto. Inlet and outlet pipes 15 and 16 extending from a liquid pressure source are connected to the pressure control valve 12. The pressure source has a pump 13 and a reservoir tank 14.

The pressure control valve 12 is a spring-centered three-position type with left and right solenoids 12L and 12R. When the solenoids 12L and 12R are in their OFF conditions, no pressures are produced in the pipes 11L and 11R. When the left solenoid 12L is electrically energized, a hydraulic pressure proportional to the magnitude of the electric input signal applied thereto is produced in the pipe 11L, and when the right solenoid 12R is energized, a hydraulic pressure proportional to the input signal applied thereto is produced in the other pipe 11R.

Figure 2:
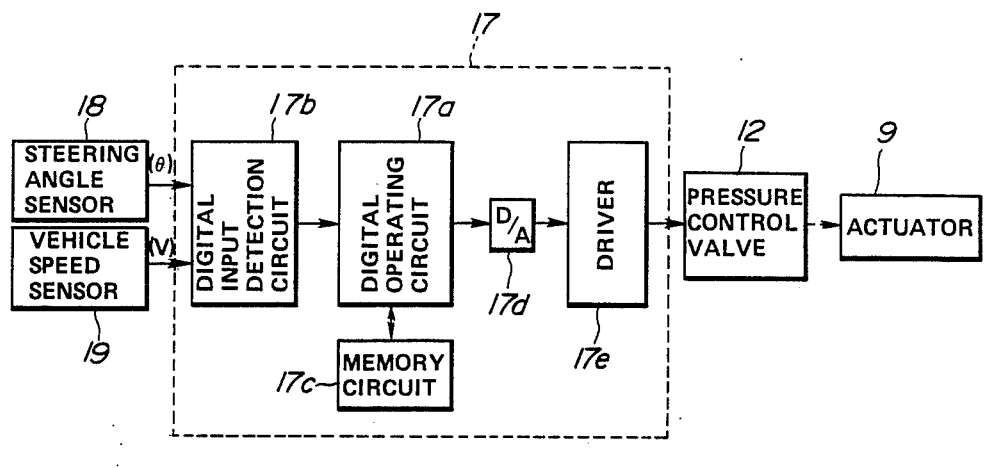
FIG. 2 is a block diagram of a control unit which is employed in the system of the present invention.

A control unit 17 electronically controls the solenoids 12L and 12R. As shown in FIG. 2, the control unit 17 comprises a digital operating circuit 17a, a digital input detection circuit 17b, a memory circuit 17c, a digital/analog conversion circuit 17d and a driver circuit 17e. A steering angle sensor 18 and a vehicle speed sensor 19 are connected to the control unit 17, so that a digital signal representative of a steering angle "θ" of the steering wheel 3 and a digital signal "V" representative of the vehicle speed are fed to the digital input detection circuit 17b of the control unit 17. Treating the information from the sensors 18 and 19 and the stored information from the memory circuit 17c, the digital operating circuit 17a computes the above-mentioned values "A", "B", "C" and "D". These values are then temporarily stored in the memory circuit 17c. The digital operating circuit 17a calculates the equation (6) using the values A, B, C and D just stored in the memory circuit 17c; and issues a digital signal representative of a desired steering angle δr of the rear wheels. The digital signal is fed to the D/A conversion circuit 17d to provide a corresponding analog signal. The analog signal is applied to the driver circuit 17e which provides an electric current i having a magnitude corresponding to the desired steering angle of the rear wheels. The current is supplied to the pressure control valve 12.

During this control operation, on the basis of the steering angle θ of the steering wheel 3, the control unit 17 judges which solenoid 12L or 12R of the control valve 12 should be energized with the current. As a result, a desired hydraulic pressure having a magnitude corresponding to that of the current is produced in pipe 11L or 11R. In accordance with this operation, the actuator 9 carries out a corresponding shifting operation, so that the rear wheels 2L and 2R are steered in a desired direction.

Figure 3A:
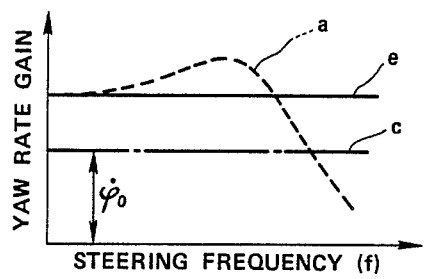
FIG. 3A is a graph showing the relationship between the steering frequency and the yaw rate gain for the system of the present invention and in a prior system art.
Figure 3B:
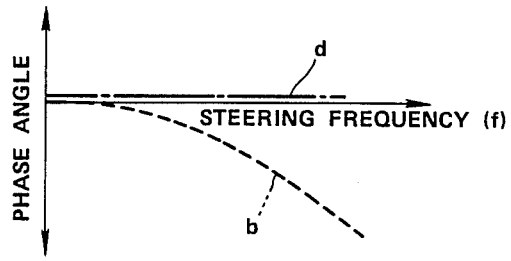
FIG. 3B is a graph showing the relationship between a steering frequency and the phase angle for the system of the present invention and for a prior art system.

As is described hereinabove, equation (6) is provided from equation (5) by replacing the term $\phi(s)/f\delta(s)$ with a desired normal yaw rate gain $\dot{\phi}_0$. This means that the value of equation (5) is kept substantially constant. Accordingly, even in the range of higher steering frequency, the yaw rate gain has a characteristic similar to that of normal yaw rate gain which is depicted by lines "c" and "e" of FIG. 3A and line "d" of FIG. 3B. Thus, in accordance with the present invention, the yaw response is good even during steering at a higher frequency.

In addition to the above, the values "B", "C" and "D" are determined by a desired normal yaw rate gain $\dot{\phi}_0$. Thus, it is possible to adjust the normal yaw rate gain to a desired value. This means that the yaw rate gain characteristic can be adjusted for each motor vehicle, that is, to the characteristic depicted by the line "c" or "e" in FIG. 3A.

What is claimed is:

1. A system for controlling the steering angle of the rear wheels of a four-wheel-steerable motor vehicle comprising:

rear-wheel steering means for steering the rear wheels of the vehicle;

first calculating means for calculating the Laplace transform $\delta f(s)$ of the front wheel steering angle of the front wheels of the vehicle;

second calculating means for calculating the Laplace transform $\delta r(s)$ of the rear heel steering angle of the rear wheels of the vehicle;

third calculating means for calculating a value G according to the equation $G=[(BS^2+CS+D)/(AS+1)]$
   $?(Bs^2+Cs+D)/(As+1)$ wherein:
   A is a function A(V) of the vehicle speed V,
   B is a function B(V,$\dot{\phi}_0$) of the vehicle speed V and the normal yaw rate gain $\dot{\phi}_0$,
   C is a function C(V,$\dot{\phi}_0$) of the vehicle speed V and the normal yaw rate gain $\dot{\phi}_0$,
   D is a function D(V,$\dot{\phi}_0$) of the vehicle speed V and the normal yaw rate gain $\dot{\phi}_0$, and
   s is the Laplace transform variable; and control means for controlling the rear-wheel steering means so that the relationship between the front wheel steering angle and the rear wheel steering angle satisfies the equation $\delta r(s)/\delta f(s)=G.$ 2. A system as claimed in 1 in which said rear-wheel steering means comprises:
   a hydraulic actuator;
   side rods which connect the hydraulic actuator to the rear wheels;
   an electromagnetic proportional pressure control valve which is responsive to said control means and which is connected to said hydraulic actuator to supply the actuator with a pressurized working fluid; and
   a fluid supply which is fluidly connected to said control valve.

3. A system as claimed in claim 1, wherein A, B, C and D are represented by the following equations:

$$A = \frac{bMV}{Cfl}$$

$$B = -\frac{\dot{\theta}_o MIV}{CfCrl}$$

$$C = \frac{V}{CfCrl}(aCfM - \dot{\theta}_o MI \cdot 2\zeta\omega_n)$$

$$D = 1 - \frac{\dot{\theta}_o VMI\omega n^2}{CfCrl}$$

where:
a: distance between front axle and center of gravity of vehicle
b: distance between rear axle and center of gravity of vehicle,
Cf: cornering power of front wheels,
Cr: cornering power of rear wheels,
M: mass of vehicle,
V: vehicle speed,
l: wheel base,
$\dot{\phi}_0$: normal yaw rate gain,
I: yaw inertia moment,
$\zeta$: damping ratio,
$\omega_n$: natural frequency.

4. A system for controlling the steering angle of the rear wheels of a four-wheel-steerable motor vehicle comprising:

rear-wheel steering means for steering the rear wheels of the vehicle;

a vehicle speed sensor for generating a signal indicative of the vehicle speed V;

a steering angle sensor for generating a signal indicative of the steering angle of a steering wheel of the vehicle; and a controller responsive to the signals from the vehicle speed sensor and the steering angle sensor and comprising:

first calculating means for calculating the Laplace transform $\delta f(s)$ of the front wheel steering angle of the front wheels of the vehicle;

second calculating means for calculating the Laplace transform $\delta r(s)$ of the rear wheel steering angle of the rear wheels of the vehicle;

third calculating means for calculating a value G according to the equation $G=[(BS^2+CS+D)/(AS+1)] (Bs^2+Cs+D)/(As+1)$ wherein:
   A is a function A(V) of the vehicle speed V,
   D is a function B(V,$\dot{\phi}_0$) of the vehicle speed V and the normal yaw rate gain $\dot{\phi}_0$,
   C is a function C(V,$\dot{\phi}_0$) of the vehicle speed V and the normal yaw rate gain $\dot{\phi}_0$,
   D is a function D(V,$\dot{\phi}_0$) of the vehicle speed V and the normal yaw rate gain $\dot{\phi}_0$, and
   s is the Laplace transform variable; an
   control means for controlling the rear-wheel steering means so that the relationship between the front wheel steering angle and the rear wheel steering angle satisfies the equation $\delta r(s)/\delta f(s)=G.$

* * * * *